US008983686B2

(12) United States Patent
Broquet et al.

(10) Patent No.: US 8,983,686 B2
(45) Date of Patent: Mar. 17, 2015

(54) SYSTEM ABOARD AN AIRCRAFT

(75) Inventors: Alexandre Broquet, Toulouse (FR);
Yannick Deleris, Grenade (FR);
Raphael Andre, Toulouse (FR); Fabien Pascal, Donneville (FR)

(73) Assignee: AIRBUS Operations S.A.S., Toulouse (FR)

( * ) Notice: Subject to any disclaimer, the term of this patent is extended or adjusted under 35 U.S.C. 154(b) by 296 days.

(21) Appl. No.: 13/109,406

(22) Filed: May 17, 2011

(65) Prior Publication Data

US 2011/0295448 A1  Dec. 1, 2011

(30) Foreign Application Priority Data

May 28, 2010  (FR) ...................................... 10 54155

(51) Int. Cl.
*G05B 9/03* (2006.01)
*G05B 23/02* (2006.01)
*G01C 23/00* (2006.01)
*G08G 5/00* (2006.01)

(52) U.S. Cl.
CPC .............. *G05B 9/03* (2013.01); *G05B 23/0272* (2013.01); *G01C 23/005* (2013.01); *G01C 23/00* (2013.01); *G08G 5/0021* (2013.01)
USPC ........ 701/14; 701/8; 701/9; 701/12; 340/945; 340/963; 244/75.1

(58) Field of Classification Search
USPC ................ 701/3, 8–18, 120–122; 714/1–824; 340/945–983; 241/75.1, 76 R, 220–237
See application file for complete search history.

(56) References Cited

U.S. PATENT DOCUMENTS

| 4,849,893 | A | * | 7/1989 | Page et al. ......................... 701/3 |
| 4,914,598 | A | * | 4/1990 | Krogmann et al. .............. 701/11 |
| 4,943,919 | A | * | 7/1990 | Aslin et al. ........................ 701/3 |
| 5,493,497 | A | * | 2/1996 | Buus ................................. 701/4 |
| 5,630,053 | A | * | 5/1997 | Morikawa ..................... 714/47.1 |
| 5,761,625 | A | * | 6/1998 | Honcik et al. ................... 701/14 |
| 6,622,972 | B2 | * | 9/2003 | Urnes et al. .................... 244/194 |
| 6,812,858 | B2 | * | 11/2004 | Griffin, III ..................... 340/945 |
| 6,981,182 | B2 | * | 12/2005 | Roddy et al. .................. 714/47.3 |
| 7,017,861 | B1 | * | 3/2006 | Johansson et al. ............. 244/194 |
| 7,065,433 | B2 | * | 6/2006 | Basu et al. .................... 701/31.9 |

(Continued)

FOREIGN PATENT DOCUMENTS

| FR | 2 916 548 | 11/2008 |
| FR | 2 934 693 | 2/2010 |
| FR | 2 935 187 | 2/2010 |

OTHER PUBLICATIONS

French Preliminary Search Repot issued Dec. 15, 2010 in Patent Application No. FR 1054155 with English Translation of Category of Cited Documents.

*Primary Examiner* — Thomas Tarcza
*Assistant Examiner* — Tyler J Lee
(74) *Attorney, Agent, or Firm* — Oblon, McClelland, Maier & Neustadt, L.L.P.

(57) ABSTRACT

The invention relates to a device aboard an aircraft comprising output means configured to restore information relating to the aircraft status from aircraft systems, the device including a module providing interface between said output means and said aircraft systems, said module being configured to synthesize information from aircraft systems depending on predetermined behavior rules and to transmit said information thus synthesized to said output means.

9 Claims, 6 Drawing Sheets

(56) References Cited

U.S. PATENT DOCUMENTS

| | | | |
|---|---|---|---|
| 7,089,452 B2* | 8/2006 | Rubin et al. | 714/32 |
| 7,149,612 B2* | 12/2006 | Stefani et al. | 701/31.9 |
| 7,561,944 B2* | 7/2009 | Yeh | 701/3 |
| 7,698,511 B2* | 4/2010 | Hess et al. | 711/154 |
| 7,702,435 B2* | 4/2010 | Pereira et al. | 701/30.8 |
| 8,014,908 B2* | 9/2011 | Clarke et al. | 701/3 |
| 8,131,406 B2* | 3/2012 | Morris et al. | 701/3 |
| 8,204,635 B2* | 6/2012 | Manfred et al. | 701/4 |
| 8,523,102 B2* | 9/2013 | Shue et al. | 244/17.13 |
| 2005/0015680 A1* | 1/2005 | Rubin et al. | 714/47 |

* cited by examiner

```
if Fuel_Qty1 < Fuel_Qty2 then
        Fuel_Qty = Fuel_Qty1
else
        Fuel_Qty = Fuel_Qty2
end
if not(available(FOB1)) & not(available(FOB2)) then
        if available(Fuel_Flow1) & available(Fuel_Flow2) then
                Fuel_Flow = average(Fuel_Flow1, Fuel_Flow2)
        else
                if available(Fuel_Flow1) then
                        Fuel_Flow = Fuel_Flow1
                else
                        if available(Fuel_Flow2) then
                                Fuel_Flow = Fuel_Flow2
                        else
                                Fuel_Flow = NULL_DATA
                                FOB = NULL_DATA
                        end
                end
        end
        if Fuel_Flow <> NULL_DATA then
                FOB = integral(0, T, Fuel_Flow)
        end
else
        if available(FOB1) & available(FOB2) then
                FOB = average(FOB1, FOB2)
        else
                if available(FOB1) then
                        FOB = FOB1
                else
                        FOB = FOB2
                end
        end
end
```

FIG.11

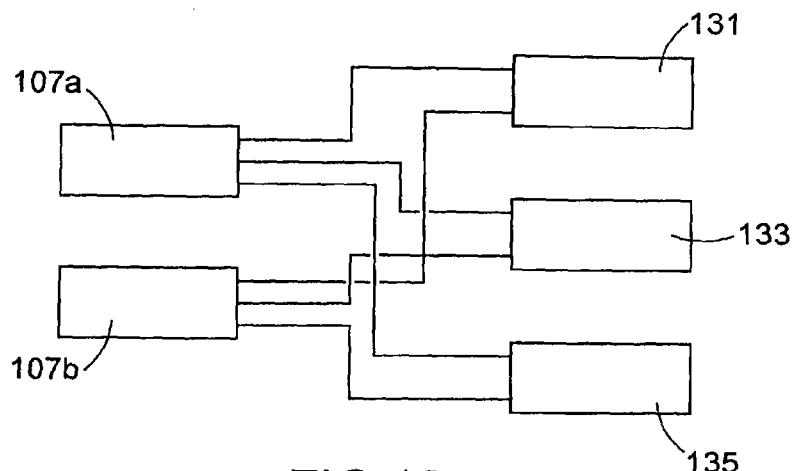
Related Art FIG.12
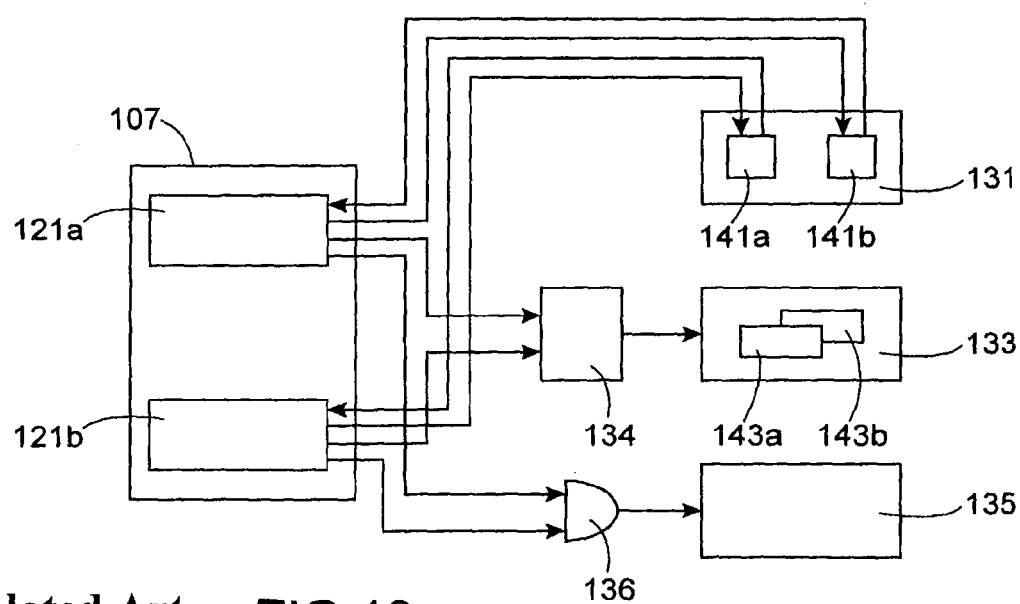
Related Art FIG.13

SYSTEM ABOARD AN AIRCRAFT

TECHNICAL FIELD

The present invention relates to the field of devices aboard an aircraft and more particularly, to an on-board device comprising output means for restoring information relating to the aircraft status. The invention also relates to an on-board device comprising input means for transmitting control data to the aircraft.

STATE OF THE PRIOR ART

Currently, the cockpit of an aircraft includes devices or human-machine interfaces HMI mainly for providing viewing, control and alert functions.

FIG. 12 shows such an on-board device including interface means corresponding to three distinct control 131, viewing 133 and warning 135 functions, connected to aircraft systems 107a and 107b.

These interface means 131, 133, and 135 are provided with viewing screens, interactive screens, warning lights, sound emitters, control panels, keyboards, controllers, etc.

The aircraft systems 107a and 107b include information sources corresponding for example to computers transmitting data about different components of the aircraft to control 131, viewing 133 and alert 135 means. More particularly, a portion of data can be sent to all the interface means 131-135 whereas another portion can only be sent to a specific interface means. For example, data about the health status of the braking system are sent to all the interface means 131-135 whereas the brake temperatures are only sent, for displaying purposes, to the viewing interface 133 unless the temperatures are above some limit considered as abnormal and in this case, the temperature data will also be sent to other interface means 131 and 135.

Moreover, the aircraft systems 107a and 107b receive control data sent by the pilots via the control interface 131 to configure, control or act on the different functions of the aircraft.

It will be generally noted that data or information can come from parallel or complementary sources. The parallel sources provide the same piece of information but in different manners or via different paths (for example, according to detectors, computing resources or different communication links). On the other hand, the complementary sources provide different pieces of information which enable a more global piece of information to be extracted.

FIG. 13 shows an example of an on-board device including control 131, viewing 133 and warning 135 interface means connected to an aircraft system 107 comprising two parallel sources corresponding to two redundant computers 121a and 121b.

The ICPS (Integrated Control Panel System) control interface 131 receives data from two computers 121a and 121b. First data from the first computer 121a and second data from the second computer 121b are separately displayed by the control interface 131 in relation with separated input-output means 141a and 141b. These data indicate to the crew whether or not a control function is in a state ready to be controlled.

Thus, the control interface 131 enables the crew to transmit controls to either or both computers 121a and 121b to control components and/or members of the aircraft. It is used for any normal control operation such as the aircraft configuration according to the flight phase and the global situation of the apparatus. It is also used in all abnormal situations to reconfigure the components and/or members of the aircraft responsive to malfunction alerts. Moreover, it provides the crew with the availability of each aircraft element under their control.

It will be noted that upon a control operation, the pilot is forced to select, for example, the first computer 121a, to store the information relating to this first computer, to select next, the second computer 121b, to store the information relating to this second computer, and to compare the two pieces of information in order to choose the more valid one to carry out the control given that both pieces of information can be valid.

On the other hand, the CDS (Control and Display System) viewing interface 133 manages viewing of data about the status or configuration of equipments, components or members of the aircraft, on cockpit screens.

First display data from the first computer 121a and second display data from the second computer 121b are first received by selecting means 134 at the input of the viewing interface 133. These selecting means 134 can select data according to a predefined criterion set, before they are displayed on the viewing interface 133 according to separated displays 143a, 143b relating to each of both computers 121a and 121b.

The FWS (Flight Warning System) warning interface 135 manages the sound and/or visual alerts for informing the crew about malfunctions, wrong configurations, or generally any abnormal situation that can have consequences on the aircraft security or performance.

More particularly, alerts from the first computer 121a can be combined by a logical "AND" 136 with those from the second computer in order to provide an alert only when there is a loss from the system of both computers 121a and 121b.

The different interface means 131-135 are partly interdependent and the pilot must check for a consistency among the different messages provided by these different interface means and then interpret all these messages in order to infer the actual status of the aircraft. The interpretation of messages requires the pilot to be implicated and therefore imposes a significant work load.

By way of example, in case of malfunction in a situation of parallel sources of information, one source can provide the crew with a piece of information that other sources do no provide. This generates an additional work load for interpreting and/or utilizing this event in order to manage the malfunction.

On the other hand, in a situation of complementary sources of information, a malfunction can have consequences on several parts or components of the aircraft making them provide different pieces of information. For example, in a fuel supplying circuit including two flowmeters provided on a same branch, if the interface means 131-135 indicate that the flow rate measured downstream is lower than the one measured upstream, the crew can probably infer the existence of a fuel leak on the branch located in between both flowmeters. According to another example, if the interface means 131-135 indicate that the engine temperature is higher than the usual temperature and that the engine consumption dramatically increases, then the crew can finally conclude that the engine is likely to be on fire (of course, other information is required to access the very nature of the malfunction).

These examples illustrate the fact that the crew must often interpret different data to extract a consistent piece of information about the actual status of the aircraft and to set and configure the different functions of the aircraft.

It is the object of the present invention to provide an intelligent device solving the abovementioned drawbacks, in particular by enabling the crew to have a quick and rational knowledge about the aircraft status and to quickly and effectively control the aircraft functions.

SUMMARY OF THE INVENTION

The present invention is defined by a device aboard an aircraft comprising: output means configured to restore information relating to the aircraft status from aircraft systems, and input means configured to transmit control data to said aircraft systems, and a module providing interface between the output and input means on the one hand, and said aircraft systems on the other hand, said module being configured to synthesize the information from the aircraft systems depending on predetermined behavior rules and to transmit said information thus synthesized to said output means, said module being further configured to provide transmission of the control data from the input means to the aircraft systems which are the most suitable for carrying out these controls.

Thus, the information from the aircraft systems is provided to the crew once they are synthesized, so as to provide a consistent and complete view of the aircraft status such that the crew does not have to interpret or link together different messages provided by the output means to be able to extract the aircraft status therefrom. The module also provides for good transmission of controls carried out by the crew by transmitting each control to the aircraft system which are the most suitable for carrying out this control. Moreover, the module can be easily inserted between the aircraft systems and output means without the latter being modified. This enables the development costs to be reduced, the pilot training to be made easier, the integration of new functions to be simplified and post-compatibilities of the aircraft to be ensured.

According to one embodiment, the module includes:
first quality control means for controlling the quality of information from the aircraft systems,
first processing means for correlating the information validated by the first control means in order to infer synthesized information using said predetermined behavior rules, and
first transmitting means for transmitting said synthesized information to said output means.

Thus, the first quality control means gather all the information from the aircraft systems in order to ensure a global, sturdy and homogeneous validation before the first processing means develop or correlate the different pieces of information thus validated to form synthesized information or messages suitable for restoration and finally, the first transmitting means identify the output means suitable for receiving the right message. This enables to set a reliable consistency between the different pieces of information in a simple and quick manner.

The aircraft systems can include computing means, sensors, and actuators, said computing means being adapted to compute said information relating to the aircraft status depending on measures provided by said sensors and/or to compute aircraft controls depending on said control data from the input means and to transmit them to the actuators in order to operate equipments and/or members of the aircraft.

Advantageously, the input and output means consist of control means, restoring means, and warning means, the control means comprising an interactive portion common to a portion of said input and output means.

Advantageously, the first transmitting means are configured to distribute said synthesized information provided by said first processing means to said control, restoring and warning means.

According to one advantageous feature of the invention, the device is characterized in that:

the module is configured to operatively synthesize information from the aircraft systems according to the aircraft functions in order to form operational synthesized information,
said control means are configured to receive from said module a portion of said operational synthesized information and/or to transmit to said module operational control data, and
said restoring means are configured to receive from said module another portion of said operational synthesized information.

According to this embodiment, the information is provided to the crew not only in a synthesized and consistent manner but also with an operational abstraction level directly giving the aircraft functions so that they do not have to deal with the different specific components which provide these functions. In this case, the control and restoring means have a simplified architecture with respect of the one of the State of the Art and are respectively configured to enable the crew to transmit simplified operational controls and to receive consistent operational messages. This further makes easier the crew tasks.

Advantageously, the restoring means include viewing means and/or sound feedback means and/or force feedback means.

The invention also aims at a device aboard an aircraft comprising input means configured to transmit control data to aircraft systems, including a module providing interface between said input means and said aircraft systems, said module being configured to synthesize the control data from input means depending on predetermined control rules and to transmit said control data thus synthesized to said aircraft systems.

Thus, the controls carried out by the crew are consistently transmitted to the aircraft systems.

According to one embodiment, the module includes:
second quality control means for controlling the quality of control data from said input means,
second processing means for correlating the control data validated by the second control means in order to infer control data synthesized using said predetermined control rules, and
second transmitting means for transmitting each synthesized control data to the aircraft systems that are the most suitable for carrying out this control.

Thus, the module enables the controls carried out by the crew to be validated, synthesized and transmitted to the aircraft systems which are the most suitable for carrying out the controls.

The invention also aims at a device aboard an aircraft including:
input means configured to transmit control data to aircraft systems, and
output means configured to restore information relating to the aircraft status from said aircraft systems,
a module providing interface between said aircraft systems on the one hand and said input and output means on the other hand, said module being configured to synthesize information from the aircraft systems depending on predetermined behavior rules and to transmit said information thus synthesized to said output means, said module being further configured to synthesize the control data from the input means depending on predetermined control rules and to transmit said control data thus synthesized to said aircraft systems.

BRIEF DESCRIPTION OF THE DRAWINGS

FIG. 11 illustrates a computer program in connection with the example of FIG. 10; and FIGS. 12 and 13 schematically show on-board devices according to State of the Art.

DETAILED DESCRIPTION OF PARTICULAR EMBODIMENTS

Figure 1:
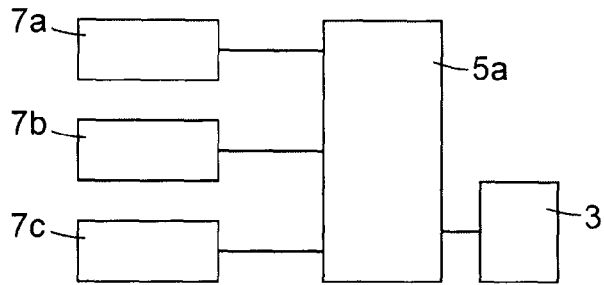
FIG. 1 schematically shows a device aboard an aircraft comprising output means and an interface module, according to the invention.

FIG. 1 schematically shows a device aboard an aircraft comprising output means 3 and an interface module 5a, according to the invention. It will be noted that FIG. 1 is also an illustration of the method for synthesizing pieces of information according to the invention.

The output means 3, comprising for example viewing screens, interactive screens, warning lights, and sound emitters (not represented) are configured to restore information relating to the aircraft status from the aircraft system 7a-7c.

The aircraft systems 7a-7c are systems for managing, controlling or regulating different functions of the aircraft such as aircraft path, engine thrust, braking, etc. By way of example, an aircraft system can include computing means in connection with sensors, and possibly actuators (see FIG. 6).

The module 5a provides an intelligent interface between the output means 3 and the aircraft systems 7a-7c. This module 5a is configured to synthesize the messages or information from the aircraft systems 7a-7c depending on predetermined behavior rules and to transmit the information thus synthesized to the output means 3 in order to provide a consistent and complete view of the aircraft status to the crew.

The interface module 5a carries out computations thereof based on all the information from the aircraft systems 7a-7c.

Indeed, from all this information, the module 5a first carries out computations beforehand to, for example, check data integrity, send an acknowledgment, or possibly request the emitting system to retransmit a message, etc.

Then, the module 5a manages the inconsistencies which are likely to be produced when there are parallel information sources (that is information sources that provide the same messages but through different means). In particular, the module 5a can detect the information source which is the most suitable for each message given that the detection depends on the current situation and the type of the message. This detection can be carried out thanks to malfunction evaluation techniques such as COM/MON architectures or voting systems.

Then, the module 5a is configured to correlate all the valid and consistent messages available to generate synthesized and sturdy messages which are representative of the aircraft status or specific elements of the aircraft.

Thus, the module 5a enables a consistent piece of information to be extracted on each component of the aircraft as well as a complete view of the aircraft per se. It also enables any useful information about malfunctions to be extracted as well as health status and availabilities of the aircraft systems allowing the pilot to effectively act on the aircraft functions. Therefore, the module recovers a whole part of the checking, correlating, and interpreting intelligence of the information instead of the pilot.

By way of example, let us assume that the aircraft systems 7a-7c correspond to electrical, pneumatic and fuel systems, respectively.

According to this example, the electrical system 7a sends a piece of information to the module 5a, indicating that the electrical power is available to the first engine, the pneumatic system 7b sends a piece of information to the module 5a indicating that the pneumatic power is available to the first engine, and the fuel system 7c sends a piece of information to the module 5a indicating that the first engine is actually fuelled. Then, the module 5a combines these three different pieces of information to send to the output means 3 a single piece of information indicating to the pilot that the first engine is available to be started up.

Figure 2:
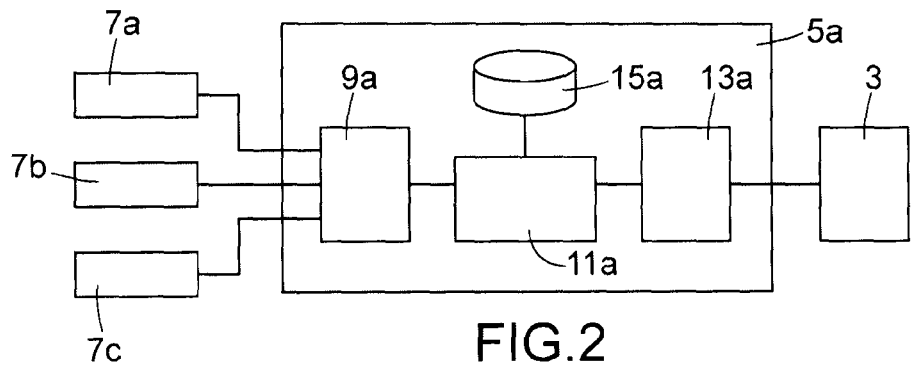
FIG. 2 illustrates an embodiment of the interface module of FIG. 1.

FIG. 2 shows one embodiment of the interface module of FIG. 1 including first quality control means 9a, first processing means 11a and first transmitting means 13a.

The first quality control means 9a are configured to control the quality of information from aircraft systems 7a-7c using a control model or a control database stored in storing means 15a which can be provided in or outside the module 5a.

The quality control means 9a control the data integrity in order to detect any alteration likely to have occurred upon data transfer. They send acknowledgments to indicate to the emitting systems that the information transmitted has actually been received. Finally, in case of reception problems, they send to the emitting systems information retransmission requests.

Thus, information from the aircraft systems 7a-7c is gathered to be globally and homogeneously validated by the first quality control means 9a. The point of making a global control is to check all the information before removing non valid information.

The first processing means 11a are configured to correlate by using the predetermined behavior rules, information validated by the first control means 9a to infer synthesized information.

The predetermined behavior rules are implemented by the first processing means 11a in connection with a behavior model or a behavior database stored in the storing means 15a. It will be noted that the behavior model corresponds to a computer program including logical behavior rules which are combined depending on the situation to provide the necessary piece of information and can cover an infinite number of situations. On the other hand, a database includes a list of all possible situations.

Thus, the first processing means 11a can develop or correlate the different validated information simply with a minimum number of computing steps to form suitable synthesized messages which are suitable for being restored to the crew.

The first transmitting means 13a are configured to transmit the synthesized information to the output means 3 while identifying the suitable elements of the output means 3 to receive the right message. The first transmitting means 13a can also use a database or a transmission or distribution model.

Figure 3:
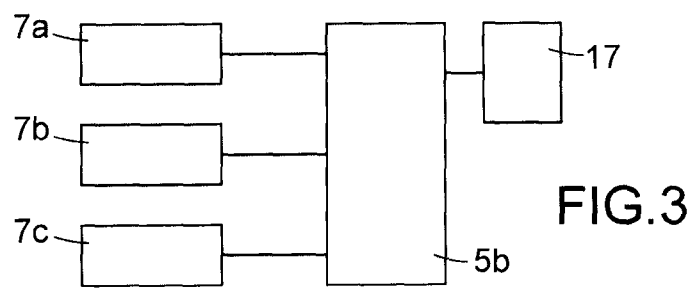
FIG. 3 schematically shows a device aboard an aircraft comprising input means and an interface module, according to the invention.

FIG. 3 schematically shows a device aboard an aircraft comprising input means 17 to transmit control data to the aircraft systems via an interface module 5b, according to the invention.

Here again, the module 5b provides an intelligent interface between the input means 17 and aircraft systems 7a-7c. More particularly, the interface module 5b is configured to synthesize control data from the input means 17 depending on predetermined control rules and to transmit the control data thus synthesized to the aircraft systems 7a-7c.

In particular, the interface module 5b is configured to manage addressing the controls, that is one and single control will be sent to different members of the aircraft depending on the situation thereof.

For example, a control for a fuel managing aircraft system will be sent to the primary computer of this system. On the other hand, if this is not able to receive it (because it is out of service, the communication network is busy, or any other reason), then the interface module 5b sends the control to the secondary computer of the system.

The same is true for the configuration controls of the autopilot system which will be sent to the primary or secondary computer depending on the availability thereof. Therefore, it is easy to devise a simplified management of the aircraft members for the pilot. Indeed, from a single reconfiguration control, the pilot could reconfigure several aircraft systems out of service without having to know which systems are out of service. On the other hand, the interface module 5b, which will be aware of this, will only send this control to safe aircraft systems.

Moreover, the interface module 5b is configured to manage the duality of control input means, that is regardless of the input means used by the pilot to control an aircraft system 7a-7c, a same control will be sent to the recipient aircraft system so that the recipient system does not have to know the details for implementing the control input means. For example, let us assume that the input means 17 propose to the pilot two means for configuration of the autopilot system: a physical one (corresponding for example to a set of physical buttons, integrated to the cockpit), enabling a control to be sent by depressing, and another virtual one (corresponding for example to a set of buttons, displayed on a screen), enabling a control to be sent by clicking a pointing peripheral. The interface module 5b receives the controls from these two input means, possibly performs the correlation and prioritization of these controls (if such are not completely compatible) and sends to the recipient aircraft systems the controls as if there was only one single control input means.

Finally, the interface module 5b enables a so-called "operational" control to be carried out, that is the pilot can actuate a control corresponding to a given task without having to know the details for implementing the aircraft system(s) 7a-7c which will perform this task. For example, a control for transferring fuel from the right wing to the left wing would be translated by the interface module 5b into a set of controls enabling this transfer to be carried out, that is opening the side transfer valve, switching of the pumps of the left wing and switching on the pumps of the right wing. Moreover, it is possible to define more complex controls, such as for example, a control for side balancing the fuel quantity which the interface module 5b would translate into a first set of controls aiming at initiating a transfer into either direction, and then, when the balance is reached, into a second set of controls aiming at stopping this transfer.

Figure 4:
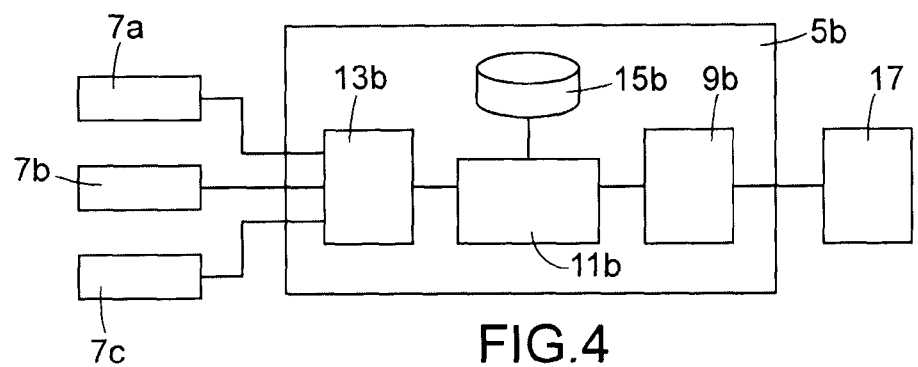
FIG. 4 illustrates an embodiment of the interface module of FIG. 3.

FIG. 4 illustrates one embodiment of the interface module of FIG. 3 including second quality control means 9b, second processing means 11b and second transmitting means 13b.

The second quality control means 9b are configured to control the quality of control data from the input means 17 by controlling for example the integrity of these data.

The second processing means 11b are configured to correlate the control data validated by the second quality control means 9b in order to infer control data synthesized by using the predetermined control rules. As above, the predetermined control rules can correspond to a behavior model of control rules or a database of control rules stored in storing means 15b, provided for example in the module 15b.

The second transmitting means 13b are configured to transmit each synthesized control data to the aircraft systems 7a-7c which are the most suitable for carrying out this control.

Figure 5:
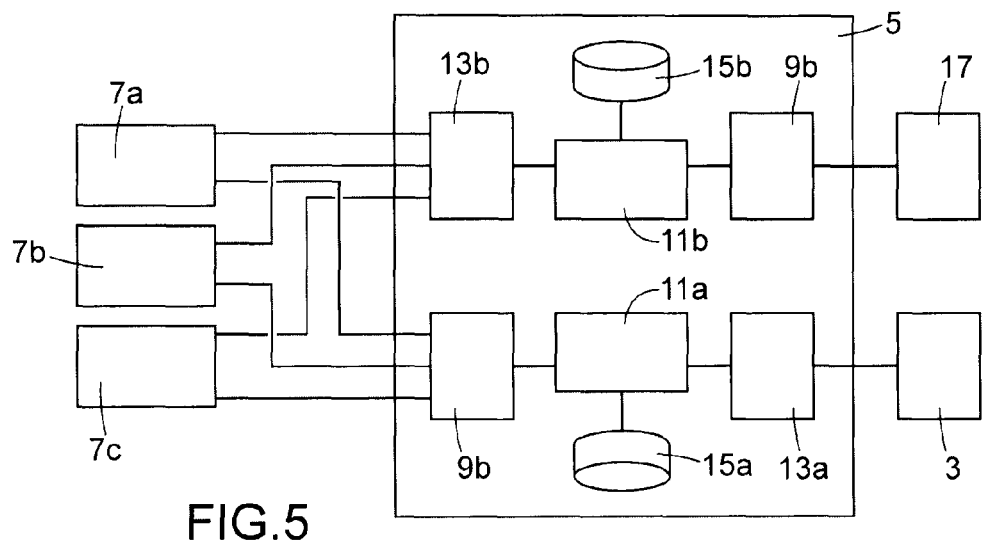
FIG. 5 schematically shows a device aboard an aircraft comprising output means, input means and an interface module, according to the invention.

FIG. 5 schematically shows a device aboard an aircraft comprising output means 3, input means 17 and an interface module 5 including the elements of both modules 5a and 5b illustrated according to FIGS. 2 and 4.

Thus, the interface module 5 includes first and second control quality means 9a and 9b, first and second processing means 11a and 11b, and first and second transmitting means 13a and 13b.

The interface module 5 can then, on the one hand, synthesize the information from aircraft systems 7a-7c to transmit it to output means 3 and, on the other hand, synthesize the control data from the input means 17 to transmit it to aircraft systems 7a-7c.

Figure 6:
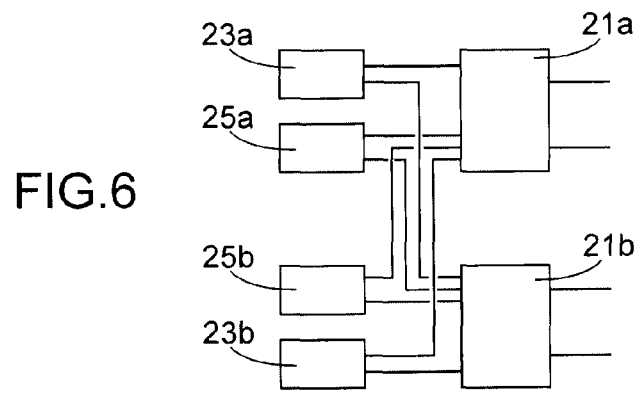
FIG. 6 schematically shows an exemplary aircraft system including computing means, sensors and actuators.

FIG. 6 schematically shows an exemplary aircraft system that can be connected to the module 5a, 5b or 5 of the preceding figures, and including computing means 21a and 21b, sensors 23a and 23b, and actuators 25a and 25b.

The computing means can consist of redundant or complementary computers 21a and 21b which are adapted to compute information relating to the aircraft status depending on measures provided by the sensors 23a and 23b. These computing means 21a and 21b are also adapted to compute the aircraft controls depending on control data from the module 5 and to transmit them to actuators 25a and 25b in order to operate equipments and/or members of the aircraft.

Figure 7:
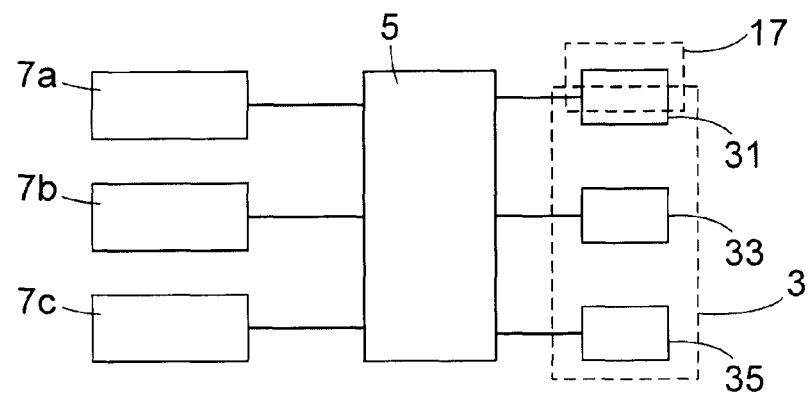
FIG. 7 schematically illustrates a particular embodiment of the device of FIG. 5.

FIG. 7 schematically shows one particular embodiment of the device of FIG. 5.

According to this embodiment, the input 17 and output 3 means consist of ICPS control means 31, CDS restoring means 33 and FWS warning means 35. In particular, the control means 31 can comprise an interactive portion common to a portion of the input 17 and output 3 means.

The module 5 is configured to control three controls, restoring and warning functions and to link them together while enabling the same interface means to be kept for the pilots.

Advantageously, thanks to the characteristics of the interface module 5 which provide a consistency, a synthesis and a good distribution of information, the restoring means 33 can integrate besides of viewing all the other restoring forms, thus increasing the device reliability. For example, the restoring means 33 can include sound feedback means and/or force feedback means besides the viewing means.

It will be noted that the control 31, restoring 33 and warning 35 means as well as the module 5 can be integrated in a single unit.

On the other hand, in order to illustrate the operation of the device according to the invention, let us assume the example of an aircraft about to reach its touchdown and where the pilot forgot to operate the landing gear into its extension position. In this case, the interface module 5 receives from the aircraft systems 7a-7c detection messages about the aircraft situation (for example, elevation, speed, global position thereof, etc.) and from which it infers that the aircraft is in a landing phase. Simultaneously, other aircraft systems 7a-7c send other messages of measures about other functions of the aircraft (for example, fuel level, speed of rotation and temperatures of the engines, configurations of the leading edge slats and landing flaps, configuration of the landing gears, etc.) from which it infers that the aircraft is not completely in a landing configuration because the landing gears, while being safe, are not in an extension position.

Then, the interface module 5 transmits to the restoring means 33 information about elevation, speed, global position, fuel level, speed of rotation of each engine, temperatures of engines, configurations of the leading edge slats and landing flaps, and configuration of the landing gears of the aircraft. It also transmits to the warning means 35, alerts signalling the existence of a hazardous situation, that is the landing gears are in a flight position and locked during a landing phase. It also transmits to the control means 31 the health status, the availability and configuration of the landing gears (locked and in up position) in order for the pilot to act on these landing gears via the control means 31 to solve the problem.

Figure 8:
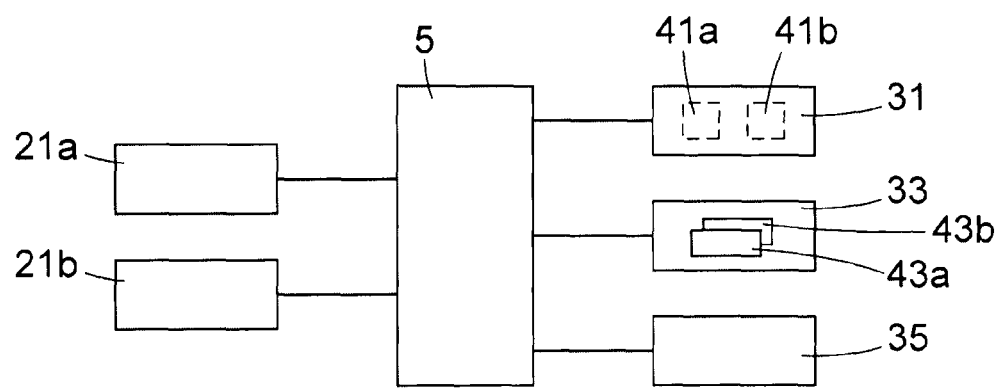
FIG. 8 schematically illustrates an exemplary device according to FIG. 7 in connection with an aircraft system comprising two redundant computers.

FIG. 8 schematically shows an exemplary device according to FIG. 7 in connection with an aircraft system including two redundant computers 21a and 21b.

The module 5 provides interface between both computers 21a and 21b and the control 31, restoring 33 and warning 35 means. Thus, by receiving the information from the computers 21a and 21b, the module 5 controls the validity of these pieces of information and correlate the one with another before sending the right synthesized message to the right recipient to restore it to the crew.

According to this example, the control means 31 are configured to restore information relating to both computers. In particular, separated displays 41a and 41b corresponding to information relating to each computer 21a and 21b are restored by the control means 31 to indicate to the crew whether or not the corresponding computer can be controlled.

The warning means 35 indicate warning information about the aircraft system.

The restoring means 33 provide synthesized information while delivering information 43a and 43b relating to both computers 21a and 21b.

The control 31, restoring 33 and warning 35 interface means can be similar to those of the State of the Art, and thus, the module 5 according to the invention can be easily inserted between these interface means 31-35 and the aircraft systems 7a-7c without changing the configuration of interfaces for the pilots.

Figure 9:
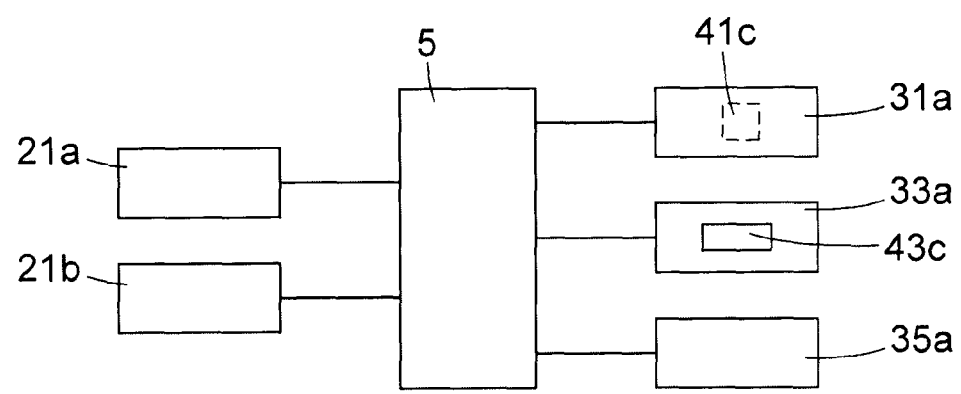
FIG. 9 schematically illustrates another exemplary device according to FIG. 7.

FIG. 9 is another embodiment of the on-board device including operatively directed control 31a, restoring 33a and warning 35a means.

More particularly, the module 5 is configured to operatively synthesize information from the aircraft systems or computers 21a and 21b depending on the aircraft functions in order to form operational synthesized information.

The control means 31a are then configured to receive from the module 5 a portion of this operational synthesized information and/or to transmit to the module operational control data. The pilot can thus control a specific function by actuating a corresponding control 41c without having to know the details for implementing or the number of computers 21a and 21b for this function.

The restoring means 33a are configured to receive from the module another portion of the operational synthesized information. The pilot thus has a piece of information 43c about each function and its availability without having to know data relating to each computer.

Figure 10:
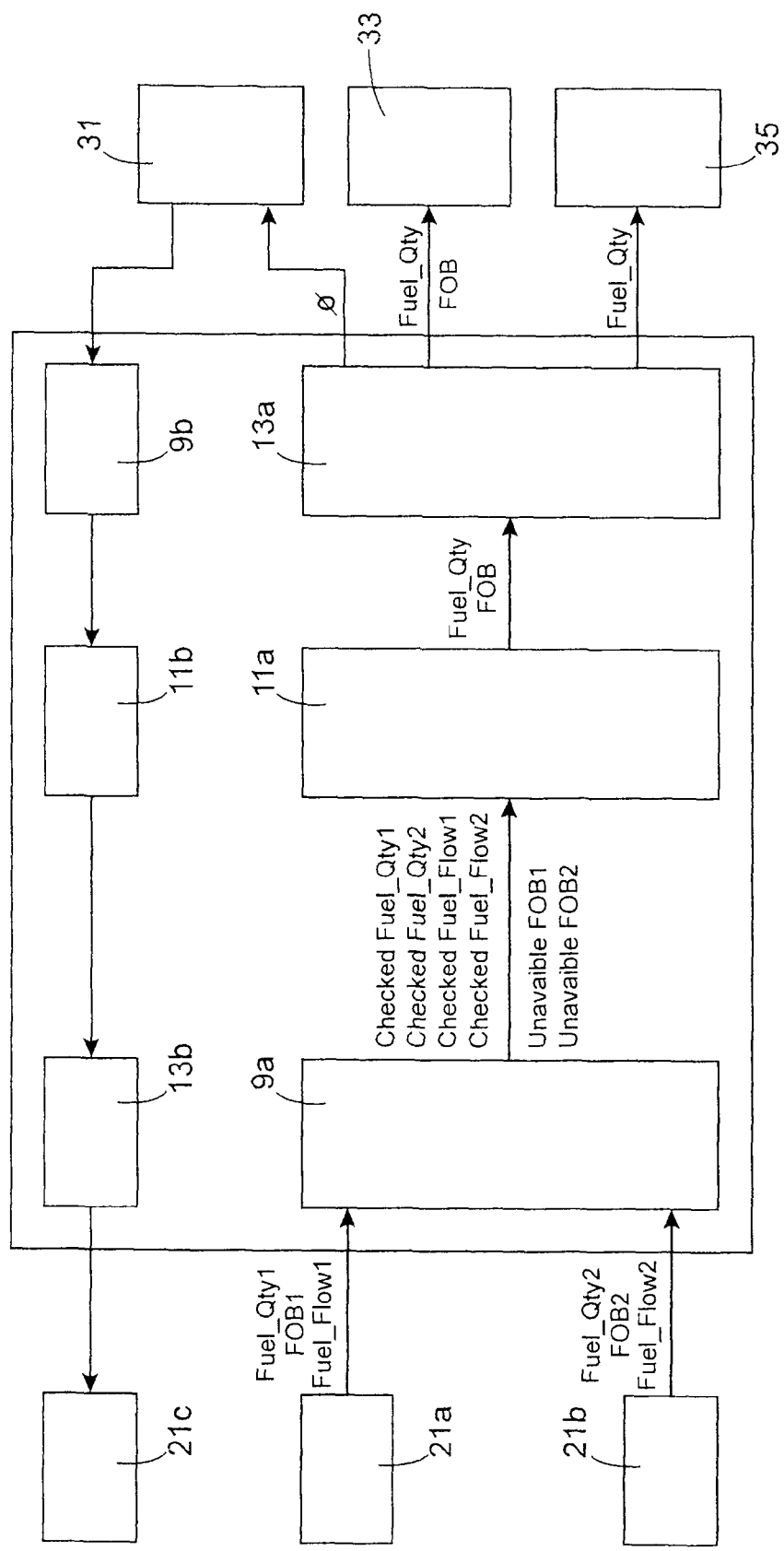
FIG. 10 is a particular example illustrating information processing by the module, according to the invention.

FIG. 10 is one particular example illustrating information processing by the interface module 5.

According to this example, the module 5 receives information about the aircraft fuel quantity from two redundant computers 21a and 21b of a fuel management aircraft system.

More particularly, the first quality control means 9a receive a measure of the fuel quantity per tank "Fuel_Qty1", a measure of the total fuel quantity in all the tanks aboard the aircraft "FOB1" (Fuel On Board), and the consumption or fuel flowrate "Fuel_Flow1" from the first computer 21a as well as the values "Fuel_Qty2", "FOB2" and "Fuel_Flow2" from the second computer 21b.

The first quality control means 9a control the quality of these pieces of information to check whether the information is valid or not (that is, whether its quality is good enough to be used) and whether it has actually been restored by the computers 21a and 21b, before transmitting it to the first processing means 11a. By way of example, the first quality control means 9a transmit to the first processing means information indicating that the "Fuel_Qty1", "Fuel_Flow1", "Fuel_Qty2" and "Fuel_Flow2" values are valid whereas those about FOBs are not valid or available.

By receiving the information transmitted by the first quality control means 9a, the first processing means 11a use the predetermined behavior rules which are specific to each aircraft system to develop or synthesize these pieces of information in a single useful piece of information for the pilot.

FIG. 11 illustrates a computer program in connection with the example of FIG. 10, which can be carried out by the first processing means 11a to synthesize the information from the computers 21a and 21b.

This program synthesizes the different pieces of information to determine the fuel quantity per tank Fuel_Qty and the total fuel quantity FOB.

The fuel quantity Fuel_Qty is determined as the minimum value of both fuel quantities Fuel_Qty1 and Fuel_Qty2.

On the other hand, if both quantities FOB1 and FOB2 are not available, the total fuel quantity FOB is computed as the flow rate Fuel_Flow integration between the initial time and the current time. The flow rate Fuel_Flow is determined beforehand as being equal to the average of the flow rates Fuel_Flow1 and Fuel_Flow2 if both flow rates are available or either of these flow rates if only one flow rate is available. If neither of both flow rates Fuel_Flow1 and Fuel_Flow2 is available, then the flow rate Fuel_Flow and consequently the total fuel quantity FOB cannot be computed.

On the other hand, the total fuel quantity FOB can be determined as being equal to the average of the quantities FOB1 and FOB2 if these two measures are available or to either of both quantities if only one single measure is available.

On the other hand, the first transmitting means 13a distribute the synthesized information (Fuel_Qty and FOB) provided by the first processing means 11a to the interface means 31-35. In particular, the fuel quantity Fuel_Qty is sent to the warning 35 and restoring 33 means, the total fuel quantity FOB is sent to the single restoring means 33, and no information is sent to the control means 31.

In the feedback direction, the module 5 checks the quality of the control from the control means 31 and provides transmission of this control to the computer 21c or aircraft system which is the most suitable for fulfilling the task controlled by the pilot.

The invention claimed is:

1. A device on-board an aircraft comprising:
processing circuitry including:
an input circuitry portion configured to transmit inputted reconfiguration control data for reconfiguration control of a plurality of different aircraft systems; and
a module providing an interface between said input circuitry portion and the different aircraft systems, said module being configured
to receive reconfiguration control data from said input circuitry portion,
to check the received reconfiguration control data to identify invalid reconfiguration control data,
to remove identified invalid reconfiguration control data from said input circuitry portion,
to synthesize correlated reconfiguration control data having invalid reconfiguration control data removed, based on the reconfiguration control data from said input circuitry portion and depending on predetermined control rules to produce a single synthesized reconfiguration control data signal,
to determine which of the different aircraft systems are operational and which should receive the single synthesized reconfiguration control data signal, and
to transmit the single synthesized reconfiguration control data signal only to the aircraft systems of the different aircraft systems that are determined operational and that should receive the single synthesized reconfiguration control data signal.

2. The device according to claim 1, wherein said module includes:
a quality control unit to control a quality of reconfiguration control data from said input circuitry portion, the quality control including validating the reconfiguration control data,
a processing unit to correlate the reconfiguration control data validated by the quality control unit to infer the reconfiguration control data synthesized using the predetermined control rules, and
a transmitting unit to transmit the single synthesized reconfiguration control data signal only to the aircraft systems that are determined operational and that should receive the single synthesized reconfiguration control data signal to perform control associated with the single synthesized reconfiguration control data signal.

3. A device on-board an aircraft comprising:
processing circuitry including:
an input circuitry portion configured to transmit inputted control data to respective different aircraft systems to control the different aircraft systems, and
an output circuitry portion configured to output information relating to an aircraft status based on a plurality of pieces of information from the different aircraft systems; and
a module providing an interface between the different aircraft systems and said input and output circuitry portions,
wherein said module is configured
to receive the plurality of pieces of information from the different aircraft systems,
to check the plurality of pieces of information from the different aircraft systems to identify invalid information,
to remove identified invalid information from the information from the different aircraft systems,
to receive control data from said input circuitry portion,
to check the received control data to identify invalid control data,
to remove identified invalid control data from said input circuitry portion,
to synthesize correlated information having invalid information removed, based on the plurality of pieces of information from the different aircraft systems, depending on predetermined behavior rules, to produce a single piece of synthesized information,
to identify to which of one or more output units of said output circuitry portion the single piece of synthesized information is to be transmitted,
to transmit the single piece of synthesized information only to the identified one or more output units of said output circuitry portion to visually and/or auditorily output the information relating to the aircraft status,
to synthesize correlated control data having invalid control data removed, based on the control data from the input circuitry portion and depending on predetermined control rules to produce a single synthesized reconfiguration control data signal,
to determine which of the different aircraft systems are operational and which should receive the single synthesized reconfiguration control data signal, and
to transmit the single synthesized control data signal only to aircraft systems of the different aircraft systems that are determined operational and that should receive the single synthesized reconfiguration control data signal.

4. The device according to claim 1, wherein said module is configured to control a quality of reconfiguration control data to the operational aircraft systems using a control database.

5. The device according to claim 1, wherein said module is configured to send the single synthesized reconfiguration control data signal to the operational aircraft systems, upon receipt of two or more inconsistent reconfiguration control data inputs at said input circuitry portion, as if only one of the reconfiguration control data inputs was received at said input circuitry portion, based on correlation and prioritization of the two or more inconsistent reconfiguration control data inputs.

6. The device according to claim 3, wherein the different aircraft systems are parallel systems.

7. The device according to claim 3, wherein the single piece of synthesized information is used by an output device to visually output the information relating to the aircraft status to a pilot of the aircraft.

8. The device according to claim 3, wherein the plurality of pieces of information includes a first piece of information from an electrical system indicating that electrical power is available for a function of an aircraft component, a second piece of information from a pneumatic system indicating that the pneumatic system is available for the function of the aircraft component, and a third piece of information from a fuel system that the fuel system is available for the function of the aircraft component.

9. The device according to claim 1, wherein the reconfiguration control data includes data created based on input to a control system by a crew member of the aircraft responsive to one or more malfunction alerts to reconfigure components and/or members of one or more of the aircraft systems.

* * * * *